US00H002266H

(19) United States
(12) Statutory Invention Registration
Blakley, II

(10) Reg. No.: US H2266 H
(43) Published: Feb. 7, 2012

(54) GLUE JIG TO POSITION ADHESIVE-APPLIED SPECIMENS

(75) Inventor: William E. Blakley, II, King George, VA (US)

(73) Assignee: The United States of America as represented by the Secretary of the Navy, Washington, DC (US)

(21) Appl. No.: 12/315,491

(22) Filed: Dec. 2, 2008

(51) Int. Cl.
*B29C 65/54* (2006.01)

(52) U.S. Cl. ..... 156/580; 425/123; 156/428
(58) Field of Classification Search ..... 156/580, 156/157, 428; 269/43, 95; 29/281.1
See application file for complete search history.

(56) References Cited

U.S. PATENT DOCUMENTS 1,404,793 A * 1/1922 Priess ..... 29/25.42
4,171,799 A 10/1979 Elko ..... 269/42
4,953,602 A * 9/1990 Smith ..... 144/349
5,702,561 A 12/1997 Phillips ..... 156/580
6,338,477 B1 * 1/2002 Moore ..... 269/60
6,595,252 B1 7/2003 Bassett et al. ..... 144/347
6,609,352 B1 8/2003 Erlund et al. ..... 53/254

* cited by examiner

*Primary Examiner*—Daniel Pihulic
(74) *Attorney, Agent, or Firm*—Gerhard W. Thielman

(57) ABSTRACT

A jig is provided for setting and gluing pairs of specimens along their joining faces to cure into a lap joint. The jig includes a platform with a setting surface flanked by first and second upright walls, first and second plates and fasteners. The platform positions the pairs of specimens for lap joint arrangement.

3 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

GLUE JIG TO POSITION ADHESIVE-APPLIED SPECIMENS

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to a glue jig for setting specimens or coupons to be adhesively bonded. In particular, the glue jig enables several specimens to be arranged for concurrent joint arranging and curing.

Specimens or coupons can be attached together for material response testing to measure strength and shear modulus of the bond. The lap joint represents one such configuration, and this can be achieved for select materials by chemical adhesive or glue.

SUMMARY

Conventional glue jigs yield disadvantages addressed by various exemplary embodiments of the present invention. In particular, various exemplary embodiments provide expansion in number of joints to be produced concurrently. Improved repeatability and scalability in establishing such joints over an extended curing interval represents an objective for the embodiments described in this disclosure.

Various exemplary embodiments provide a jig for setting and gluing pairs of specimens along their joining faces to cure into a lap joint. The jig includes a platform with a setting surface flanked by first and second upright walls, first and second plates and fasteners. The platform positions the pairs of specimens for lap joint arrangement. The setting surface has a plurality of orifices disposed along the pairs of specimens.

The orifices are disposed along a longitudinal non-joining face, a lateral non-joining face, or a corner of adjacent specimens. The first and second plates are fastened respectively adjacent said first and second upright walls opposite the setting surface with the fasteners to tighten the plates to the upright walls. The pins are inserted into corresponding orifices to retain the pair of specimens along their non-joining faces from translation along the setting surface.

The plurality of pins includes retainer pins along said longitudinal non- joining face, alignment pins along said lateral non-joining face, and stop pins at said corners of adjacent pairs of specimens. The plates include threaded orifices through which to insert the fasteners.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Figure 1:
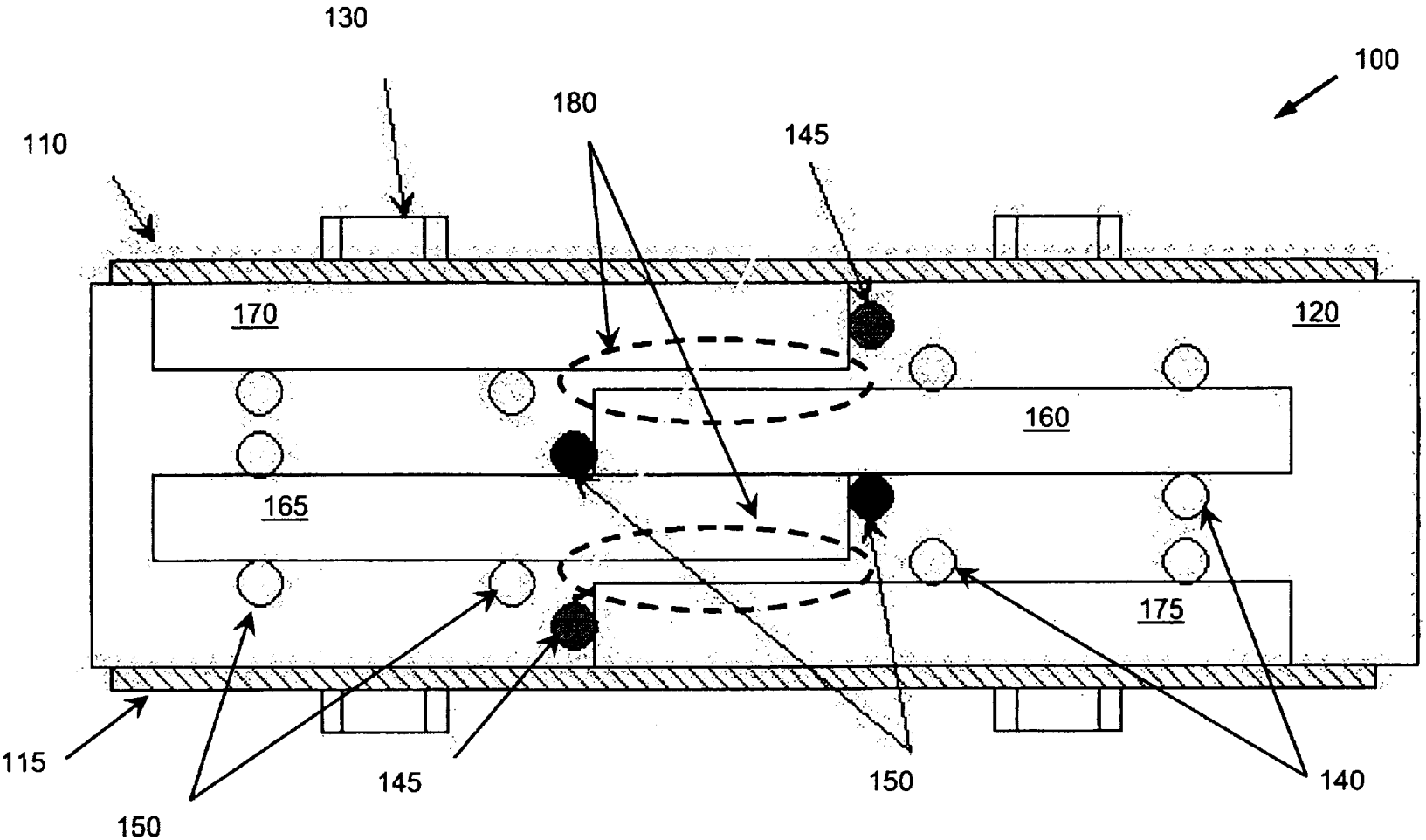
FIG. 1 is a plan schematic view of a glue jig.

FIG. 1 shows a plan schematic view 100 of a glue jig. The jig restrains specimens for fusing together using adhesive, such as glue. The exemplary configuration described corresponds to a single lap joint, although artisans of ordinary skill will recognize other configurations can be contemplated without departing from the scope of the invention.

The glue jig includes an upper side plate 110 and a lower side plate 115 to constrain a jig box 120. Both plates 110, 115 are removable upon complete curing of the adhesive. A set of thumb nuts 130 secures the plates 110, 115 to the box 120 to inhibit lateral movement. The plates 110, 115 include holes passing therethrough, with screw threads extending half-way through the thickness from outward to inward. Tightening the nuts 130 enables the plates 110, 115 to hold the box 120 in compression. The box includes a setting platform on which the specimens are positioned for gluing together, and bounded by upright walls. Some specimens can be disposed to abut either wall.

The box 120 uses retaining pins 140 for specimen disposition along their longitudinal axes as well as glue alignment pins 145 for specimen disposition along their lateral axes. Stop pins 150 restrict the specimens at their corners, for example where specimens abut each other The pins 140, 145, 150 are secured to the box 120 by orifices drilled through its bottom face and are disposed upright therein. These orifices correspond to the same diameter as their respective pins.

The schematic view 100 shows four specimens: first 160, second 165, third 170 and fourth 175. The initial alignment pins 140 restrain the specimens from lateral translation, whereas the glue alignment pins 145 restrict longitudinal sliding. The specimens 160, 165, 170, 175 are disposed with one edge (or wall) facing the jig box. Adhesive regions 180, identified by dash ovals, correspond to the interfacing surfaces of the specimens to be glued together.

As shown, upper and lower lap joints provide an example configuration, although the box 120 is not limited thereto. The third sample 170, adjacent the upper plate 110, adheres to the first sample 160. The fourth sample 175 adheres to the second sample 165 adjacent the lower plate 115.

The glue jig is designed for Tensile-Lap Adhesive Specimen Preparation for reproducible production of tensile-lap thick specimens to measure strength and shear modulus of non-rigid adhesives. This preparation conforms to ASTM D3983-98, Standard Test Method for Measuring Strength and Shear Modulus of Non-rigid Adhesives by the Thick-Adherend Tensile-Lap Specimen.

Exemplary embodiments of the glue jig were developed due to restraints imposed by 1) specimen specific preparation requirements and 2) available testing equipment. The glue jig, for the configuration described, can hold two pairs of specimens in place for corresponding pairs of lap joints during cure interval. However, this depicted arrangement is not limiting being extendible to additional specimens, and/or alternate types of joints. Removable side plates 110, 115 and retaining pins 140, 145, 150 facilitate use of the jig. The metal frame is readily oiled with spray to inhibit undesired sticking if any glue is spilled on parts not intended to form the glue joint.

Figure 2:
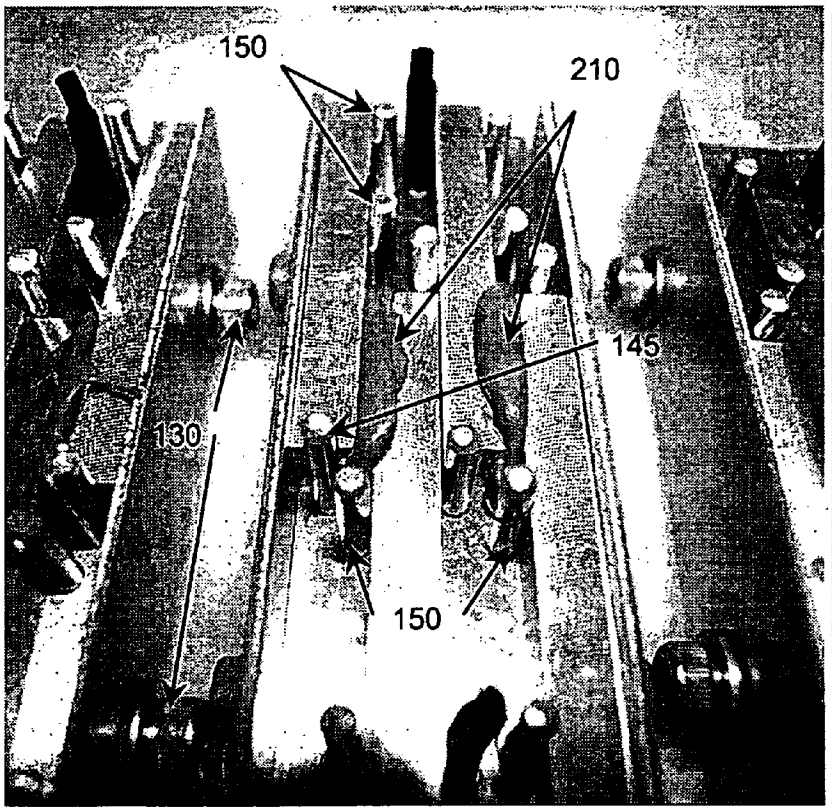
FIG. 2 is a perspective view of the glue jig with adhered components.

FIG. 2 shows a perspective view 200 of the jig box 120 with a pair of single lap joints adhering pairs of specimens. Excess glue 210 escapes from the joint regions 180 after squeezing the specimens together for desired separation.

Figure 3:
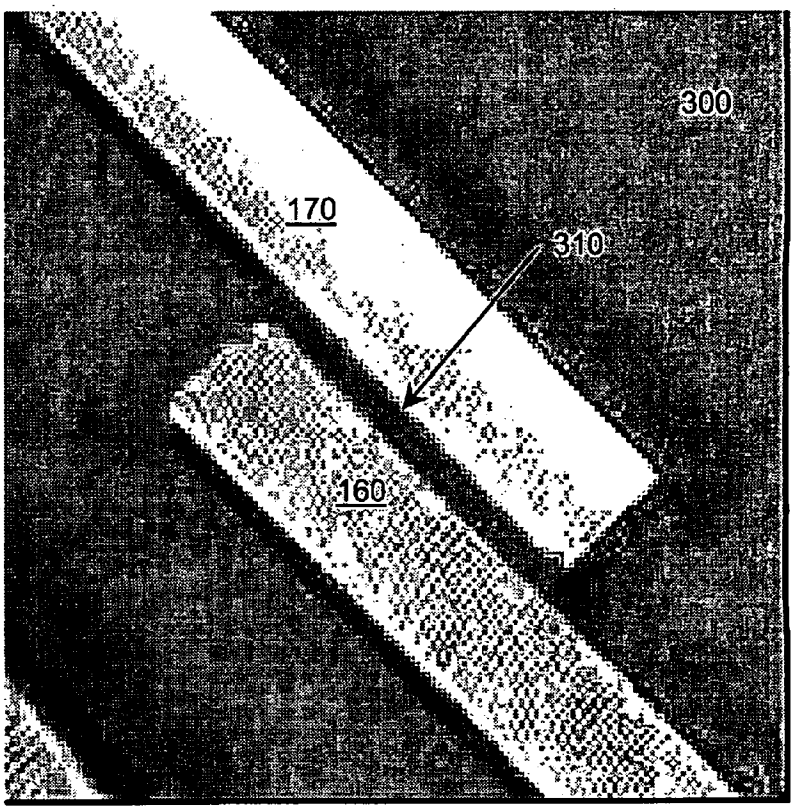
FIG. 3 is a plan view of a glue joint fusing two specimens.

FIG. 3 shows a plan view 300 of a glue joint fusing two specimens. Removal of the excess glue shows a single lap joint 310 (within the joint region 180) to securely attach the first and third specimens 160, 170 together Procedures for use can be generalized as follows: First, place the first and second specimens 160, 165 as metal test parts with dimensions 2"×0.25"×0.300" into the center of the box 120 of the glue jig so that one end of each specimen rests against the stop pins 150.

Second, for the upper half, deposit appropriate amount of glue on the first specimen 160 as well as the third specimen 170 against the alignment pin 140. Third, gently tighten the side plate thumb screws 130. This tightens the first specimen 160 to the third specimen 170, thereby leaving a glue line thickness of 0.060" by 0.750" length.

Fourth, repeat this process for the lower half of the Glue Jig with the second and fourth specimens 165, 175. After a suitable post-cure period, remove the pins 140, 145, 150 from the glue jig box 120 and gently remove the test specimens 160, 165, 170, 175 and trim the excess glue 210 from the edges and ends with an appropriate knife.

The development of this glue jig provides several advantages over the glue jig in the ASTM standard. For a single lap joint, two or more specimens can be cured in the same jig. The joints can be reproducible for preparing and comparing multiple sets of specimens. Removable retaining pins 140, 145, 150 facilitate removal of test specimen 160, 165, 170, 175 without prying, preventing damage to the glue joint 310. Metal parts to be adhered in this manner can tolerate heat loads during adhesive cure multiple times and are thus less vulnerable to warp or other distortion. This type of jig can be manufactured in any size to fit a wide variety of applications.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A jig for setting and gluing pairs of specimens along their joining faces to cure into a lap joint, said jig comprising:

a platform for containing the pairs of specimens, said platform including a setting surface flanked by first and second upright walls, the specimens being disposable on said setting surface parallel to each other and partially overlapping to form the pairs for lap joint arrangement along the joining faces, said setting surface having a plurality of orifices disposed along the pairs of specimens, each orifice of said plurality of orifices being disposed at one of along a longitudinal non-joining face, a lateral non-joining face, and a corner of adjacent specimens;

first and second plates respectively adjacent and parallel to said first and second upright walls opposite said setting surface;

fasteners for tightening said plates to said upright walls;

a plurality of pins for inserting upright into corresponding orifices of said plurality of orifices to retain the pair of specimens along said non-joining faces from translation along said setting surface.

2. The jig according to claim 1, wherein said plurality of pins includes retainer pins along said longitudinal non-joining face, alignment pins along said lateral non-joining face, and stop pins at said corners of adjacent pairs of specimens.

3. The jig according to claim 1, wherein said plates include threaded orifices through which to insert said fasteners.

* * * * *